United States Patent [19]
Lai

[11] Patent Number: 5,752,118
[45] Date of Patent: May 12, 1998

[54] CAMERA

[75] Inventor: Jing-Shiun Lai, Taichung, Taiwan

[73] Assignee: Shansun Technology Company, Ltd., Taipei Hsien, Taiwan

[21] Appl. No.: 796,703

[22] Filed: Feb. 6, 1997

[51] Int. Cl.$^6$ .............................. G03B 1/04; G03B 17/02; G03B 17/26

[52] U.S. Cl. ...................... 396/513; 396/411; 396/446; 396/538

[58] Field of Search ................... 396/411, 413, 396/418, 512, 513, 516, 535, 538, 446

[56] References Cited

U.S. PATENT DOCUMENTS

| | | | |
|---|---|---|---|
| 5,481,325 | 1/1996 | Wada et al. | 396/513 |
| 5,555,057 | 9/1996 | DiRisio | 396/513 |
| 5,630,192 | 5/1997 | Kobayashi | 396/513 |

Primary Examiner—A. A. Mathews
Attorney, Agent, or Firm—Pennie & Edmonds LLP

[57] ABSTRACT

A camera has a cartridge mounting chamber which receives a film cartridge with a cartridge spool, a film exit, and a light-intercepting door. The camera includes a spindle for holding the cartridge spool, a drive mechanism for rotating the spindle in a first direction to feed the film during the photographing operation and in a second direction to wind up the film after completing the photographing operation. The drive mechanism includes a sun gear, a first planetary gear and a second planetary gear engaging the sun gear, and a planetary carrier holding the first and second planetary gears and disposed coaxially with the sun gear. The sun gear is rotatable in two directions for turning the planetary carrier between a first position, in which the first planetary gear drives the spindle in the first direction, and a second position in which the second planetary gear drives the spindle in the second direction. A door driving gear engages with one of the first and second planetary gears before the planetary carrier reaches the first position so as to open the light-intercepting door of said film cartridge before the spindle is rotated in the first direction.

8 Claims, 18 Drawing Sheets

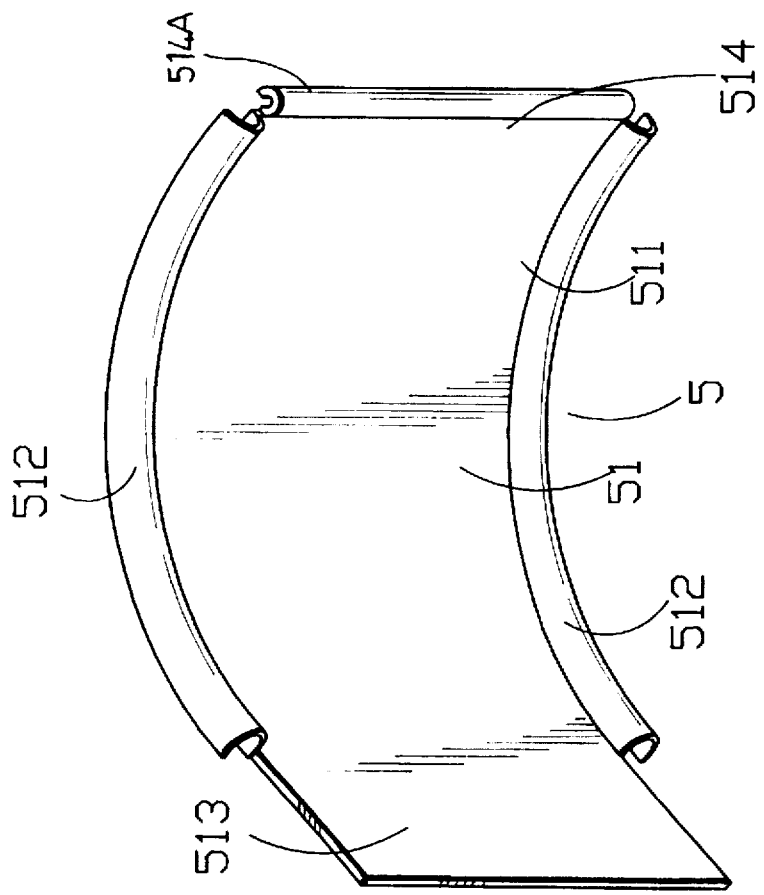

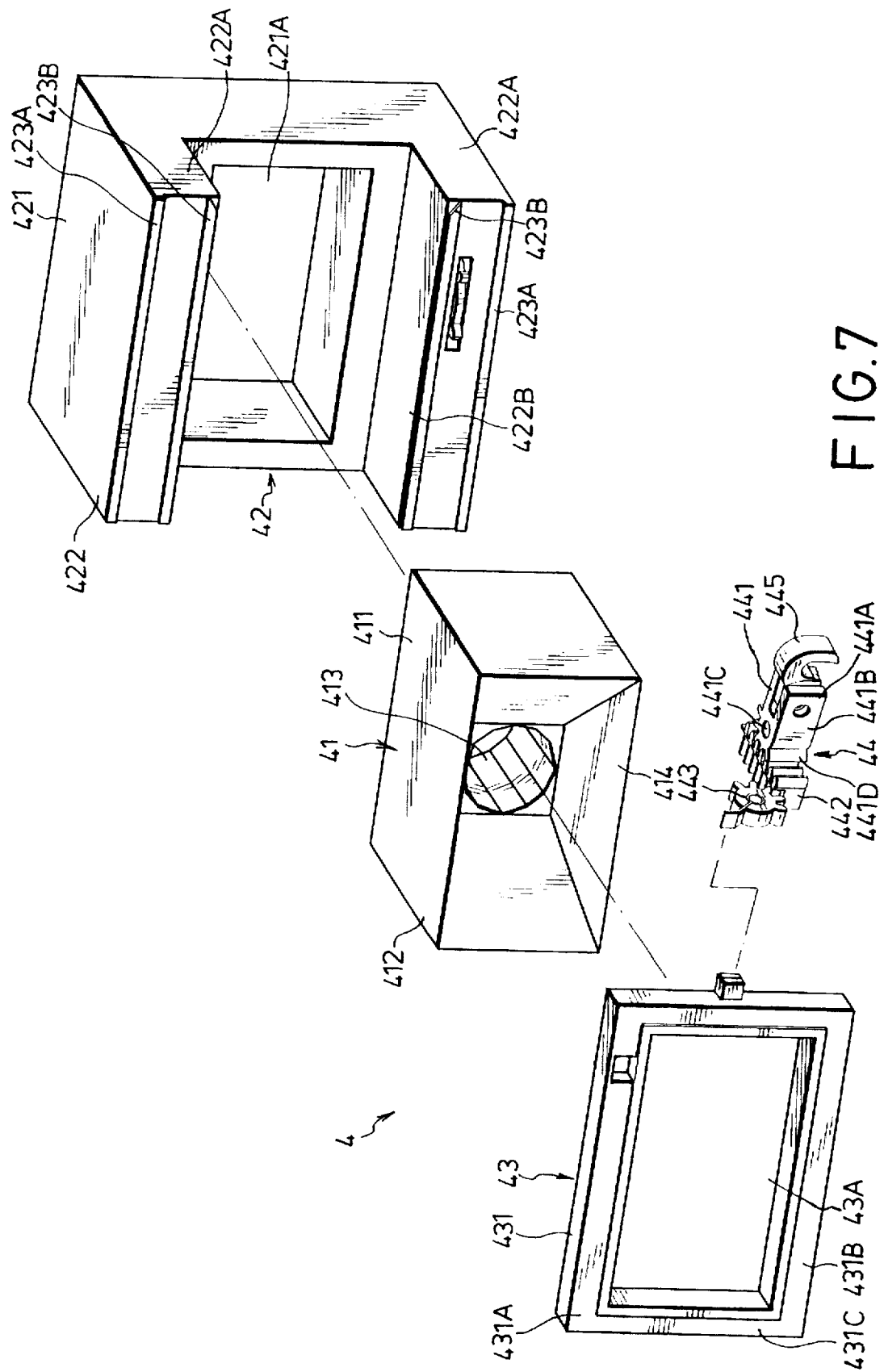
F I G. 7

CAMERA

BACKGROUND OF THE INVENTION

1. Field of the Invention

This invention relates to a camera, more particularly to a camera which has a film cartridge mounting chamber capable of accommodating film cartridges of different sizes, and a film take-up chamber with a film guide device available for guidance of different sizes of films. The camera further includes a novel picture screen adjustment mechanism and an improved drive mechanism for opening and closing a light-intercepting door of a thrust-type film cartridge.

2. Description of the Related Art

Various types of cameras have existed in the art for accommodating different types of film cartridges, such as a 135 mm standard size film cartridge, a thrust type film cartridge, etc. These conventional cameras were generally constructed such that they accommodate only one type of film cartridge, and thus, their application is limited. Specifically, a camera designed for use with a 135 mm size film cartridge is not applicable for an APS film cartridge. In order to diversify the application of a camera, U.S. Pat. No. 5,389,983 suggests a camera capable of accommodating a cartridge of imperforated film, in addition to a conventional film cartridge containing a standard size perforated film, i.e. a 135 mm size film cartridge. The construction of such a camera is however merely suitable for film cartridges having the same size and is thus not usable for different sizes of film cartridges, such as a 135 mm size cartridge and a so-called APS film cartridge which is smaller than the 135 mm size.

It has been known in the art that an APS thrust type film cartridge has a light intercepting door therein to open or close the entrance/exit of the film of the cartridge. A camera employing this type of film cartridge should have a drive mechanism for opening and closing the light intercepting door. U.S. Pat. No. 5,481,325 discloses a camera which has a drive mechanism for actuating the light intercepting door of an APS film cartridge, and a lock mechanism for locking a cartridge compartment cover. The drive mechanism interlocks with the lock mechanism so as to surely prevent the cover from being opened when the light intercepting door of the film cartridge is opened. The lock mechanism is actuated between a locking state and an unlocking state by an actuating mechanism which is driven by a drive mechanism of a film feeding device. A detector switch is mechanically coupled to the mechanisms to detect whether or not the intercepting door of the film cartridge is driven to an opened position before the film feed drive mechanism drives the spool of the film cartridge. The construction of the mechanisms is complicated and requires a large number of component parts.

Cameras which employ picture size adjustment mechanisms for regulating the screen size of the picture to be formed on a film were known in the art. U.S. Pat. No. 5,493,356 discloses a camera which comprises a shutter unit incorporating a picture size selecting mechanism. The picture size selecting mechanism utilizes a plurality of regulating plates which are movable along parallel planes and which can move towards or away from each other to confine a variable picture screen area for a film. The shutter unit incorporating the adjustment mechanism as such requires more space not only at the upper and lower sides but also at the left and right sides of the shutter unit and thus adversely affects the mounting of a film feed control unit, such as a feed counter for a 135 mm size film which is usually mounted adjacent to the shutter unit.

SUMMARY OF THE INVENTION

An object of this invention is to provide a camera which is capable of accommodating film cartridges of different sizes.

A second object of this invention is to provide a camera with a screen size selecting mechanism which can be mounted within the camera without requiring extra space in the vertical or horizontal directions as compared to the conventional adjustable screen size confining mechanism.

A third object of this invention is to provide a camera with a film guiding device useful for guiding different sizes of films.

A fourth object of this invention is to provide a camera which can be employed with a thrust film cartridge having a light intercepting door. The camera has a mechanism for opening the intercepting door which is cooperative with a drive mechanism for driving a cartridge spool to feed the film so that the light intercepting door is surely opened prior to a film feed operation such that no additional detector is necessary for detecting whether the light intercepting door is opened before the driving of the cartridge spool.

A fifth object of this invention is to provide a camera which can be employed with a film cartridge having a light intercepting door. The camera includes a mechanism for actuating the door to close which is operable via the movement of a variable focus lens.

Accordingly, in a first aspect of the invention, a camera includes a film cartridge mounting chamber which has a bottom film cartridge opening for loading the small film cartridge and a rear film cartridge opening for loading of the large film cartridge, a back cover for closing the rear film cartridge opening, and a bottom cover for closing the bottom film cartridge opening. A lower spindle member is mounted on the bottom cover for holding the bottom of a cartridge spool of the loaded film cartridge. An upper spindle member is mounted on the top of the cartridge mounting chamber for holding a top of the cartridge spool of the loaded film cartridge. A first elastic clamping member is mounted inside the cartridge mounting chamber for applying an axial clamping force on the top of the loaded film cartridge. A second elastic clamping member is mounted inside the cartridge mounting chamber for applying a lateral clamping force on the periphery of the loaded film cartridge.

According to a second aspect of this invention, the camera includes a photographing unit provided between a take-up chamber and a cartridge mounting chamber. The photographing unit includes a lens housing which has a front housing portion holding a lens, and a rear housing portion that defines a diverging light passage. A screen adjustment frame has an opening and a frame part that confines the opening. The frame part is movable rearward and forward along a direction of the light passing through the diverging light passage for confining the light to pass through the opening of the adjustment frame, whereby the adjustment frame can be mounted without increasing its mounting space in upward and downward directions or left and right directions.

According to a third aspect of the invention, the camera can be employed with a thrust type film cartridge having a light intercepting door.

According to a fourth aspect of the invention, the camera has a variable focus lens connected to the light intercepting door via an actuating mechanism mounted on the top of the cartridge mounting chamber. Forward movement of the actuating mechanism is capable of closing the light intercepting door.

According to a fifth aspect of this invention, the camera is provided with a driving mechanism for rotating the spindles of the cartridge mounting chamber. The driving mechanism can rotate a first spindle of the cartridge mounting chamber in a first direction to feed the film during the photographing operation, and in a second direction to wind up the film after completing the photographing operation. The driving mechanism includes a sun gear, first and second planetary gears engaging the sun gear, a planetary carrier which holds the first and second planetary gears so as to be coaxial with the sun gear, and a door driving gear unit mounted on the top of the cartridge mounting chamber to connect a second spindle for driving the light intercepting door of a film cartridge. The sun gear is rotatable in two direction for turning the planetary carrier between a first position, in which, the first planetary gear drives the first spindle in the first direction, and a second position, in which the second planetary gear drives the first spindle in the second direction. The door driving gear engages the first planetary gear before the carrier reaches the first position so as to open the light intercepting door before the first spindle is rotated in the first direction, whereby the door is surely opened before the cartridge spool is driven to feed the film.

BRIEF DESCRIPTION OF THE DRAWINGS

Other features and advantages of this invention will become apparent in the following detailed description of the preferred embodiments of this invention with reference to the accompanying drawings, in which:

FIG. 6 is a perspective view of a guide sheet employed in the film take-up chamber of the camera of this invention;

FIG. 7 is an exploded view of the photographing unit of the camera of this invention;

DETAILED DESCRIPTION OF THE PREFERRED EMBODIMENTS

Figure 1:
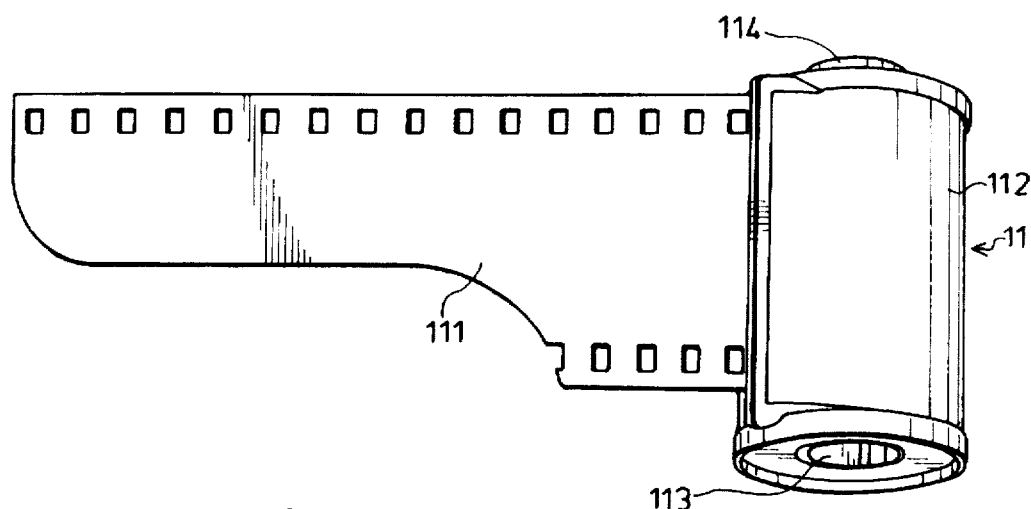
FIG. 1 is a 135 mm film cartridge adapted to be employed in the camera of this invention.

Before the present invention is described in greater detail, it should be noted that same reference numerals have been used to denote like elements throughout the disclosure.

Figure 2:
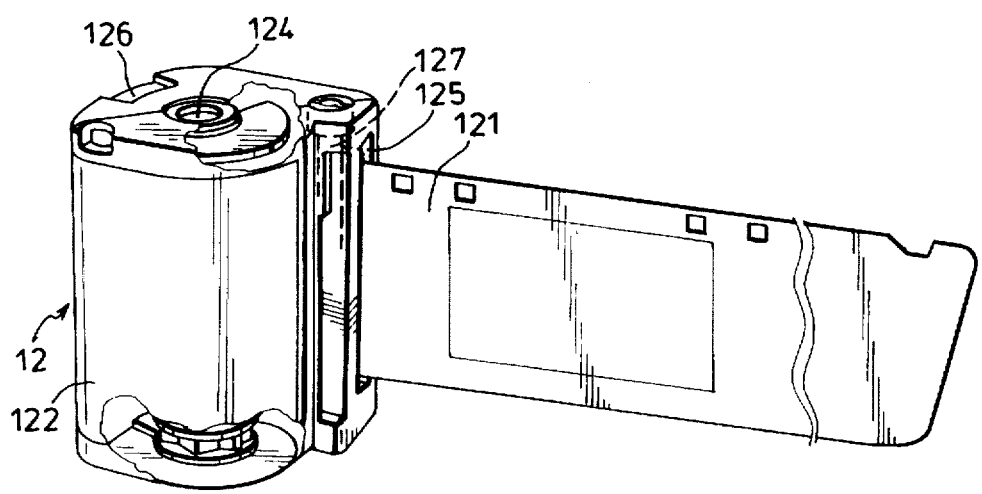
FIG. 2 is an APS (Advance Photo System) film cartridge adapted to be employed in the camera of this invention.

FIGS. 1 and 2 respectively show a large size film cartridge, such as a 135 mm size film cartridge 11, and a small size film cartridge, such as an APS (Advanced Photo System) film cartridge 12 which will be used as examples for illustrating a preferred embodiment of a camera according to this invention.

As illustrated, the APS film cartridge 12 includes a film cartridge casing 122, a cartridge spool 124, a built-in film 121 rotatably disposed in the film cartridge casing 122, a film entrance/exit 125, and a light intercepting door 127 openable at the film exit by turning about a door axis to close the film exit 125 in order to prevent light from entering into the film cartridge casing 122.

Figure 3:
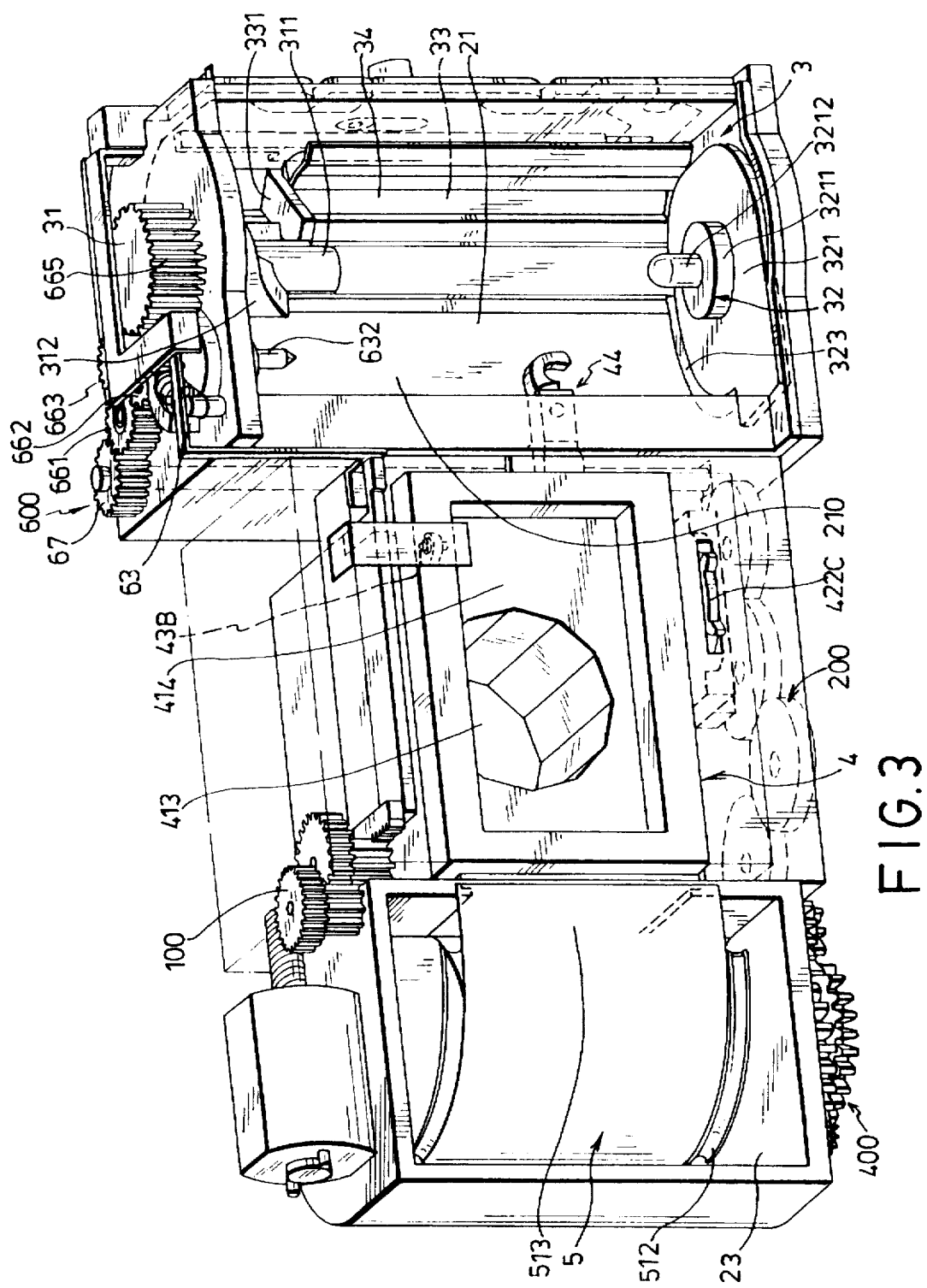
FIG. 3 is a perspective and schematic view of a camera of this invention, wherein the external casing and its back cover are removed for clarifying the interior of the camera, the cartridge mounting chamber of the camera being illustrated in a state to receive a small film cartridge therein.

Referring to FIG. 3, a camera of this invention is shown to include a light-tight casing which has a film cartridge mounting chamber 21, a film take-up chamber 23, and a photographing unit 4 provided between the cartridge mounting chamber 21 and the film take-up chamber 23.

As illustrated, the cartridge mounting chamber 21 is formed with a bottom 3 which has a bottom film cartridge opening 323 for loading of the small size film cartridge 12 (see FIG. 2) and a rear film cartridge opening 210 for loading of the large size film cartridge 11 (see FIG. 1). In addition to the back cover, the camera has a hinged bottom cover 321 below the cartridge mounting chamber 21 for closing the bottom film cartridge opening 323. The cartridge mounting chamber 21 further has a first spindle which is formed by an upper and lower spindle members 31, 32, and a downwardly extending second spindle 632, the purposes of which will be described later. The lower spindle member 32 is mounted on the hinged bottom cover 321 for holding the bottom of the cartridge spool of the loaded film cartridge. The upper spindle member 31 is mounted on the top of the cartridge mounting chamber 21 above the lower spindle member 32 to hold the top of the loaded film cartridge. Each of the upper and lower spindle members 31, 32 includes a small-diameter section 311, 3212 for extension into the spool 124 (see FIG. 2) of the small film cartridge 12, and a large-diameter section 312, 3211 coaxially formed with the small-diameter section 311, 3212 for extension into the spool 114 (see FIG. 1) of the large film cartridge 11.

Figure 5:
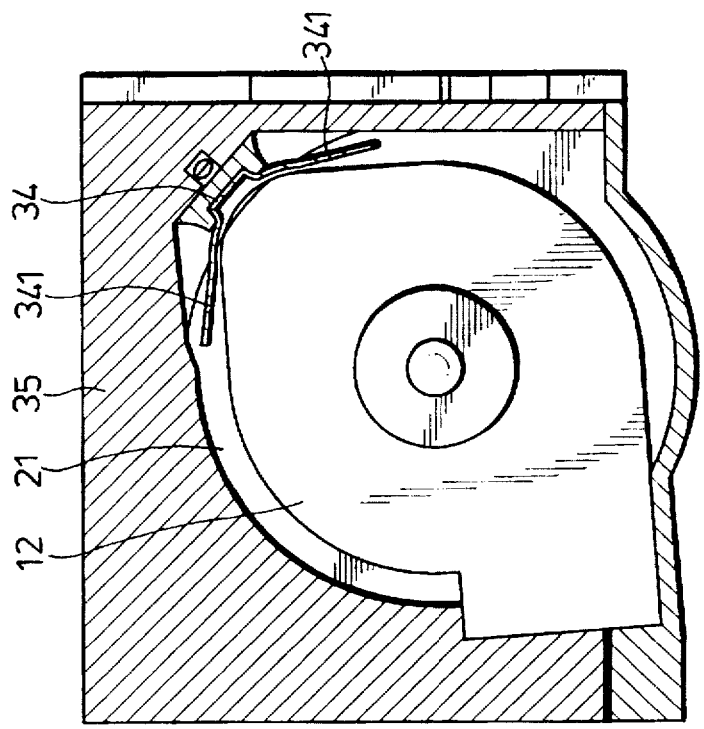
FIG. 5 shows a partly sectional view of the cartridge mounting chamber of the camera according to this invention, illustrating how the clamping member installed therein clamps the periphery of the loaded film cartridge.
Figure 4:
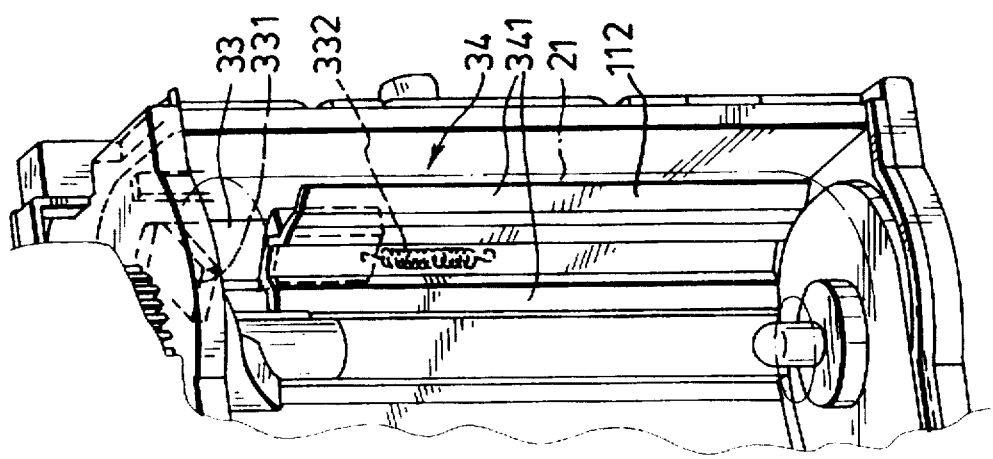
FIG. 4 is a cutaway and enlarged view of the cartridge mounting chamber of the camera of this invention, the cartridge mounting chamber being illustrated in a state to receive a large film cartridge therein.

As best shown in FIGS. 4 and 5, the cartridge mounting chamber 21 has a surrounding wall 35 which extends between the top and bottom thereof, and an axially extending L-shaped first elongated plate 33 which is mounted on an inner surface of the surrounding wall 35 in axially slidable condition. The first plate 33 has a clamping member 331 that projects into the mounting chamber 21 from the upper end thereof and which is biased downward by a tension spring 332 to press or apply a clamping force on the top of the loaded film cartridge in an axial direction. Therefore, the first plate 33 serves as a first clamping member.

The cartridge mounting chamber 21 further includes a second elongated plate 34 which has an intermediate portion fixed to the surrounding wall 35 so as to extend axially of the first spindle, and two spring leaf portions 341 extending from two opposite sides of the intermediate portion for applying a clamping force on the periphery of the loaded small or large film cartridge 11, 12 (see FIGS. 1 and 2). The second plate 34 is generally a metal plate and functions as a second clamping member. With the second clamping member, the loaded film cartridge 11 can be protected from vibrations, and the film exit of the film cartridge 12 can be properly positioned with respect to the film feeding path of the camera.

Figure 14:
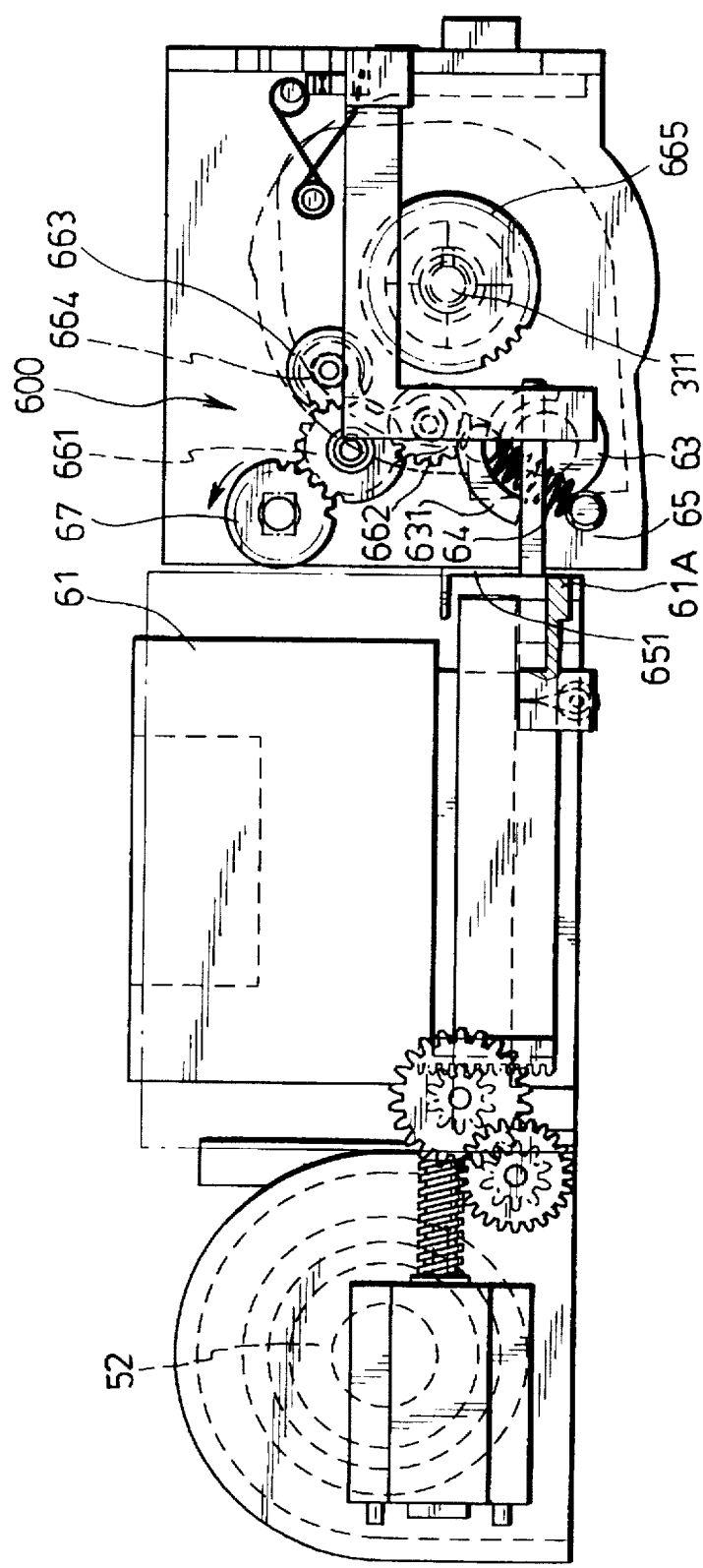
FIG. 14 is a top view, illustrating how a film feeding and winding device is mounted on the film cartridge mounting chamber of the camera according to this invention.

Because the film cartridges 11 and 12 (see FIGS. 1 and 2) respectively have small and large film widths and in order to facilitate winding of the films of both film cartridges 11, 12 around a winding spool during the photographing operation, a film guide 5 is installed in the film take-up chamber 23, as shown in FIG. 3. Referring to FIG. 6 and in combination with FIG. 3, the film guide 5 includes a film guide sheet 51 made of a flexible material which is disposed around the winding spool 52 (see FIG. 14) of the film take-up chamber 23 and which has a fixed end 513 riveted to the back cover 24 (see FIG. 21) of the camera in a conventional manner, a freely movable end 514, and a curved guide surface 511 which extends from the fixed end 513 to the freely movable end 514. The film guide sheet 51 further includes upper and lower flanges 512 which are formed by curving the upper and lower ends of the sheet 51. The rounded faces of the upper and lower flanges 512 project toward the winding spool 52 so as to define a channel therebetween for passage of the small width film 121 (see FIG. 2) during the photographing operation. The freely movable end 514 of the film guide sheet 51 further has a side flange 514A which projects toward the surface of the winding spool (not shown). The upper, lower and side flanges 514A contact the surface of the large width film 111 (see FIG. 1) with their rounded faces for pushing the film against the winding spool (not shown) and guiding the same to move around the winding spool 52 (see FIG. 14) properly.

Referring to FIGS. 3, 7, 8(A) and 8(B), the photographing unit 4 includes a lens 413, a lens housing 41, a lens mounting frame 42, a screen adjustment frame 43, and a moving mechanism 44 for moving the screen adjustment frame 43. The lens housing 41 includes a front housing portion 411 which holds the lens 413 therein and a rear housing portion 412 which defines a diverging light passage 414 therein for passage of light after entering through the lens 413. The lens mounting frame 42 includes a front frame portion 421 which defines a rectangular receiving space 421A to receive fittingly the front housing portion 411, and a rear frame portion 422 which has parallel upper and lower walls 422A extending rearwardly from the front frame portion 421 to define a screen adjustment chamber 422B between the rear end of the lens mounting frame 42 and the front housing portion 411. The upper and lower walls 422A of the lens mounting frame 42 have two pairs of film rails 423A, 423B formed on the rear wall ends to confine a screen area when the film section is passed therethrough. The rear housing portion 412 of the lens housing 41 extends into the screen adjustment chamber 422B. The screen adjustment frame 43 has a frame part 431 which is formed by an upper frame member 431A, a lower frame member 431B, and two opposite side frame members 431C that interconnect the upper and lower frame members 431A, 431B to confine a rectangular opening 43A. The adjustment frame 43 is sleeved movably around the rear housing portion 412 of the lens housing 41 so as to be disposed inside the screen adjustment chamber 422B and so as to be guided thereby for forward and rearward movement by the moving mechanism 44 between a first position and a second position. Note that the opening 43A of the adjustment frame 43 and the lens housing 41 have uniform rectangular cross-sections.

Referring again to FIG. 3, the photographing unit 4 further includes a first conventional film feed control member 422C which is exposed in part from the rear frame portion of the lens mounting frame 42 to control film feed operation of the film 111 (see FIG. 1), and a second conventional film feed control member 43B, such as a perforation detecting device, which is provided at a rear end surface of the adjustment frame 43 so as to control film feed operation of the film 121 (see FIG. 2) during the photographing operation.

Referring again to FIG. 7, the adjustment frame moving mechanism 44 includes a swinging arm 441 which has a moving end portion 441A extending into the cartridge mounting chamber 21 (see FIG. 3) and a pivot portion 441B that is formed with a vertically extending pivot hole 441C and a sector-shaped gear section 441D around the pivot hole 441C, and a rack 442 which is movably mounted inside the casing (not visible) to move in a direction parallel to the light direction thereof and which engages the sector-shaped gear section 441D. A pinion 443 is mounted rotatably on the adjustment frame 43 in such a manner to engage the rack 442. The screen adjustment frame 43 is normally biased to be positioned at the first position. Because the swinging arm 441 is pivoted via the pivot hole 441C, the moving end portion 441A of the swinging arm 441 is swingable to turn forward or rearward. A pawl member 445 is pivotally attached to the moving end portion 441A of the swinging arm 441 and is generally biased downward. An APS film cartridge has a data disk sensing window 126 (see FIG. 2) for exposing a data disk of the film cartridge 12 when the film thereof exits through the film exit 125. When the film is exposed as such, the film cartridge 12 is prohibited from entering the cartridge mounting chamber 21 since the pawl member 445 can engage a notch of the exposed data disk (a well-known feature of the data disk of an APS film cartridge), thereby preventing the film cartridge 12 from moving into the cartridge mounting chamber 21. The pawl member 445 thus serves as a stop member. When the film is not exposed, the pawl member 445 does not engage the film cartridge 12 and is thus turnable upward by inward movement of the film cartridge 12, thereby permitting the former to be loaded in the cartridge mounting chamber.

Figure 8B:
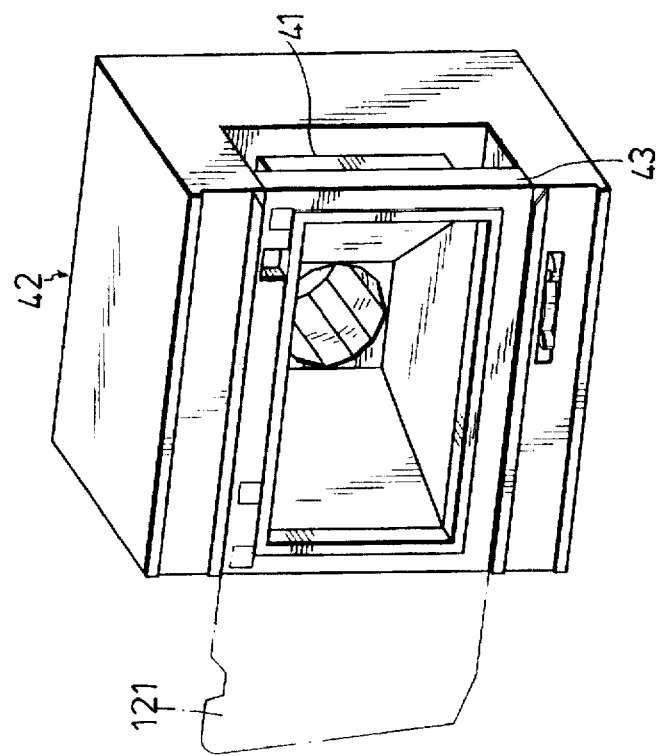
FIGS. 8(A) and 8(B) are side and rear views of the photographing unit of the camera of this invention, wherein the screen adjustment frame is illustrated in a first position.
Figure 8A:
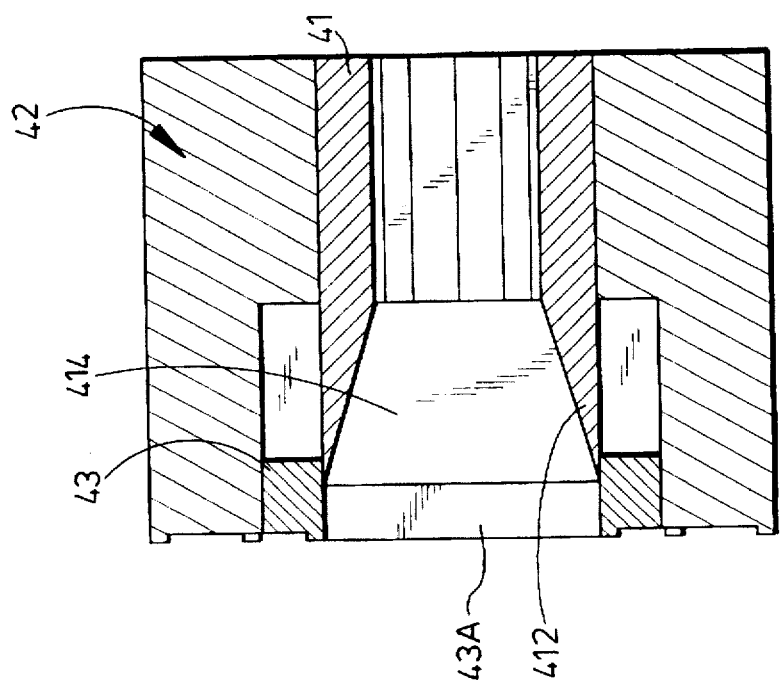

Referring again FIGS. 8(A) and 8(B), when at the first position, the adjustment frame 43 is placed at the rear end of the rear housing portion 412, and the opening 43A of the screen adjustment frame 43 is communicated with the diverging light passage 414 of the lens housing 41, thereby confining the light to pass through the opening 43A or defining a first screen area on the film section 121 which is fed from the cartridge mounting chamber 21 (see FIG. 3).

Figure 9B:
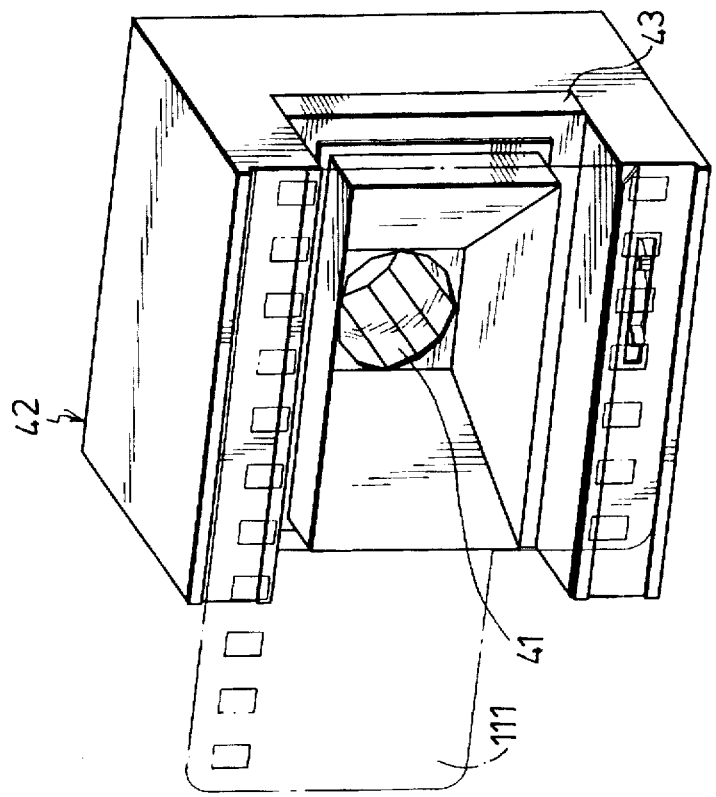
FIG. 9 is another side view of the photographing unit of the camera of this invention, wherein the screen adjustment frame is illustrated in a second position.
Figure 9A:
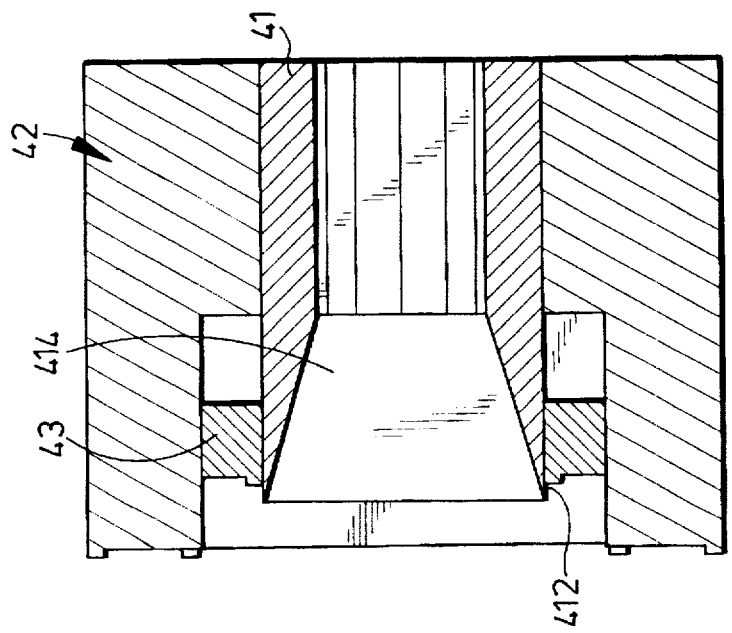

Referring to FIG. 9 and in combination with FIG. 7, when the large film cartridge is loaded into the cartridge mounting chamber 21 (see FIG. 3) via the rear cartridge opening 210, the moving end portion 441A of the swinging arm 441 is pushed by the large film cartridge so that the adjustment frame 43 is moved forward along the light path via the rack 442 and the pinion 443, thereby disposing the screen adjustment frame 43 at the second position. At the second position, the adjustment frame 43 is placed anteriorly of the rear end of the rear housing portion 412 of the lens housing 41 so that the opening 43A of the screen adjustment frame 43 is discommunicated from the diverging light passage 414 of the lens mounting frame 42, thereby providing a second screen area on the film section 111 which is larger than the first screen area provided by the adjustment frame 43.

Figure 10:
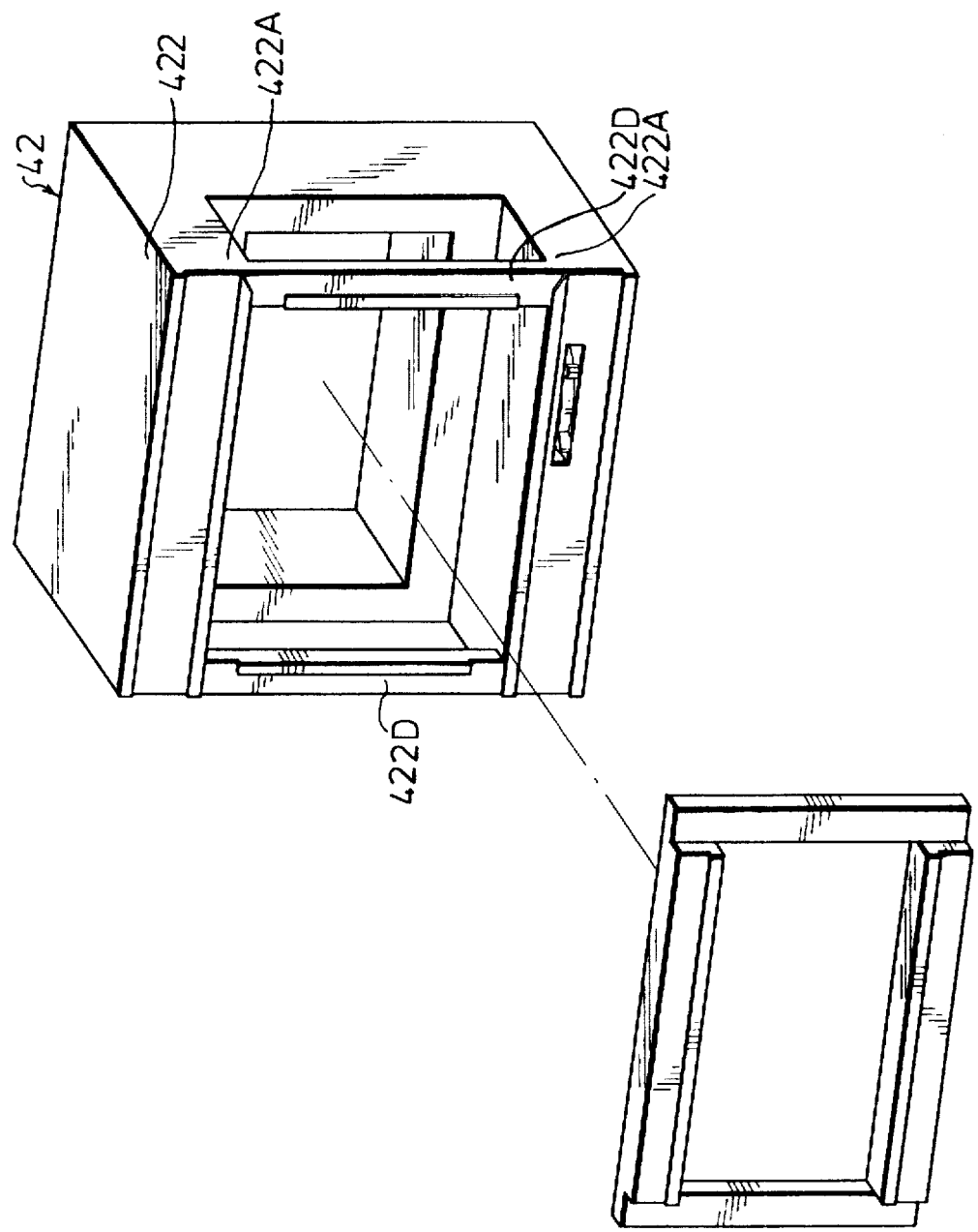
FIG. 10 is a modified photographing unit employed in the camera of this invention.

Referring to FIG. 10, in one embodiment, the rear frame portion 422 of the lens mounting frame 42 further has two vertical confining members 422D which extend vertically to interconnect the upper and lower walls 422A so as to limit the horizontal dimension of the first screen area.

Figure 11:
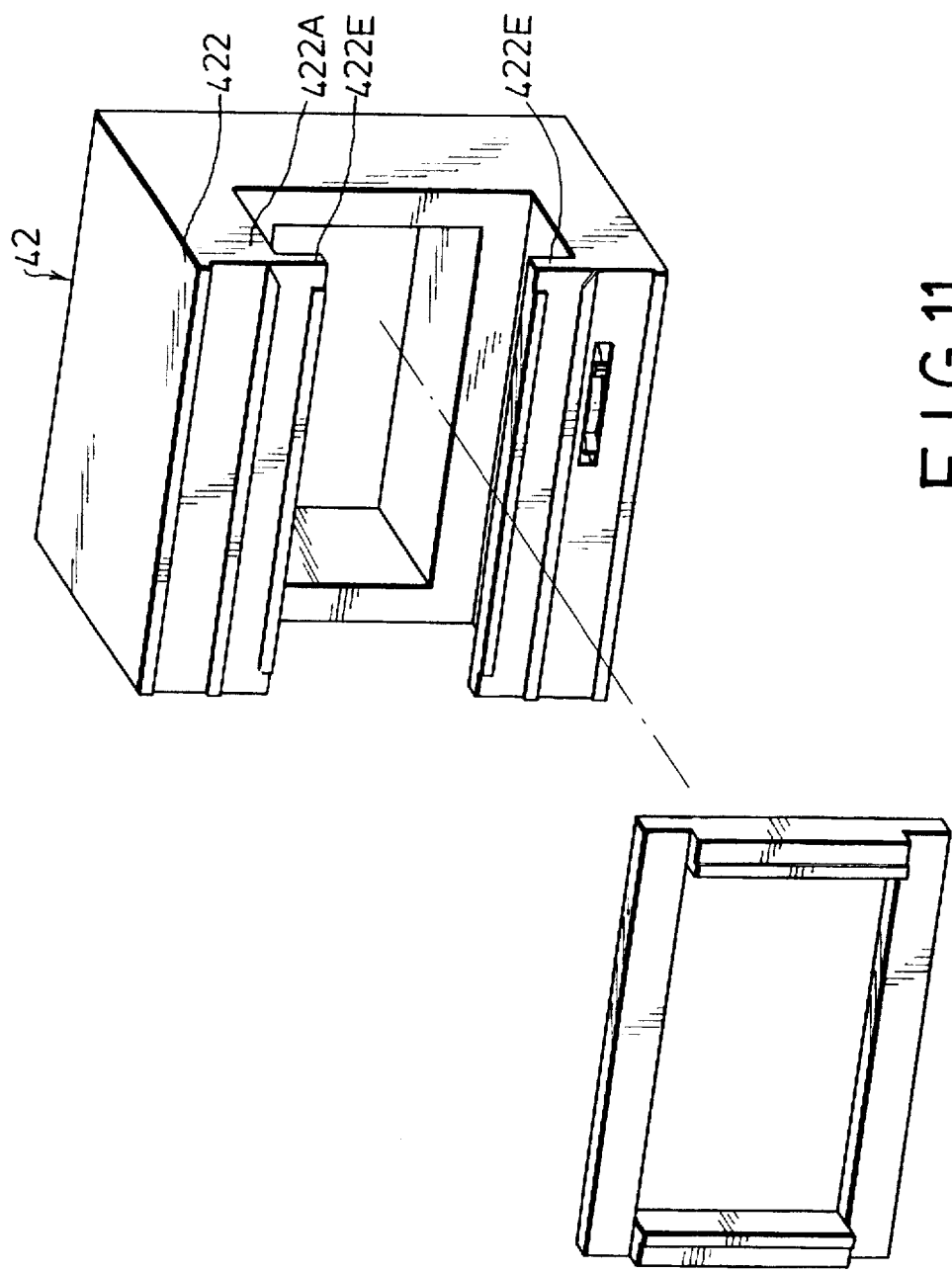
FIG. 11 is another modified photographing unit employed in the camera of this invention.

Referring to FIG. 11, in another embodiment, the rear frame portion 422 of the lens mounting frame 42 has two horizontal confining members 422E which extend inwardly from the upper and lower walls 422A to limit the vertical dimension of the first screen area.

Figure 12:
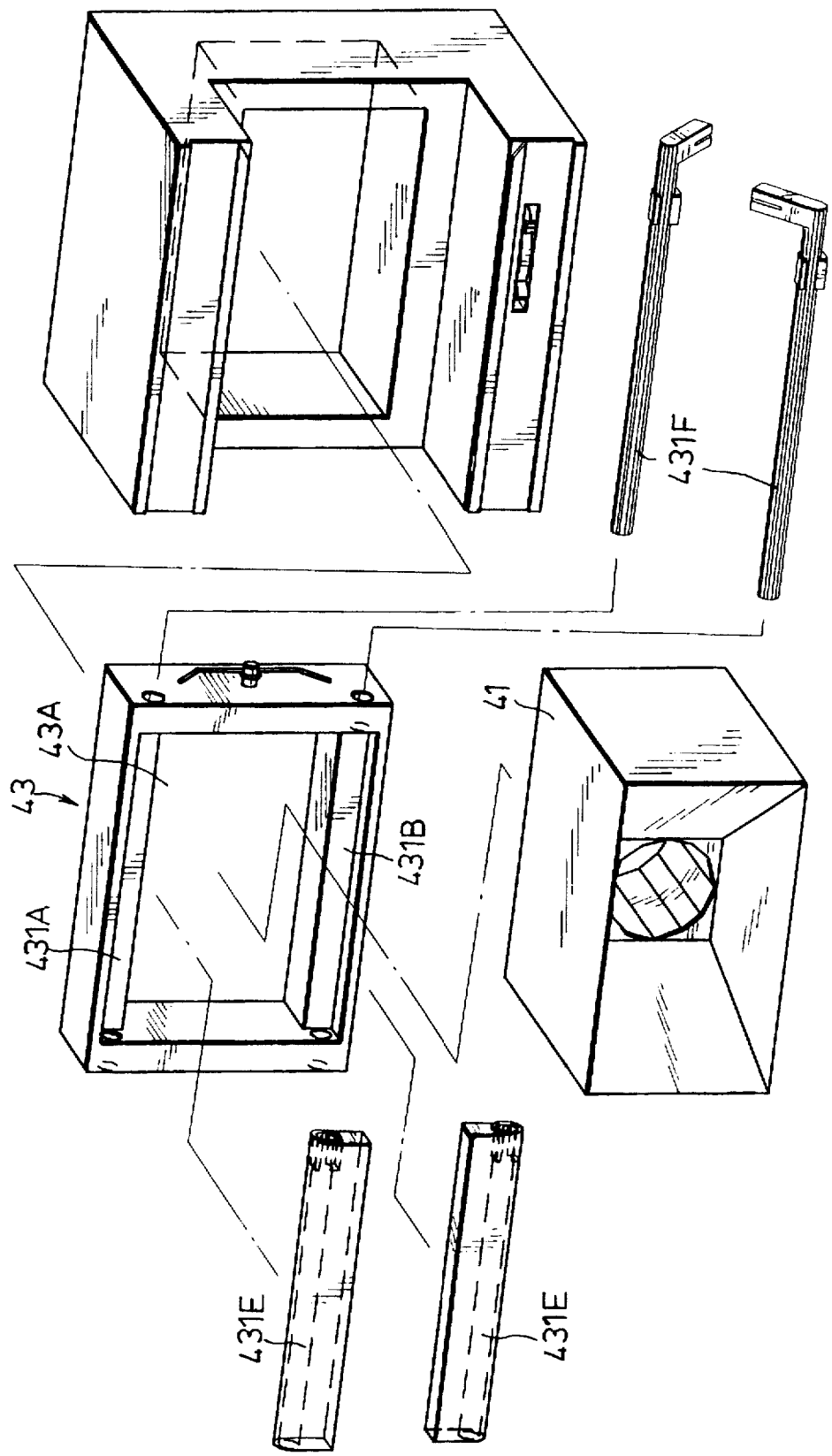
FIG. 12 is an exploded view of still another modified photographing unit of the camera of this invention, wherein the photographing unit is formed with screen size regulating members to provide variable screen size.
Figure 13B:
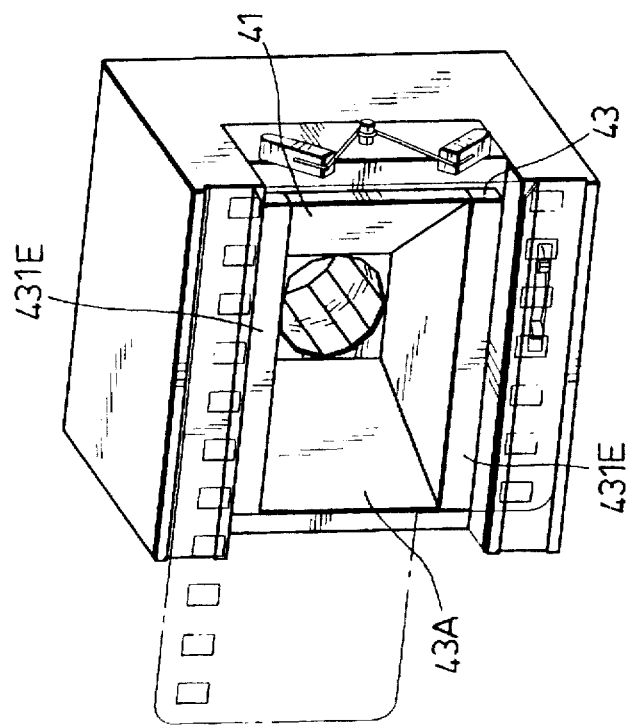
FIGS. 13(A) and 13(B) respectively illustrate how the screen regulating members are regulated in order to form a large-sized screen and a small-sized screen on the film section passing through the photographing unit thereof.
Figure 13A:
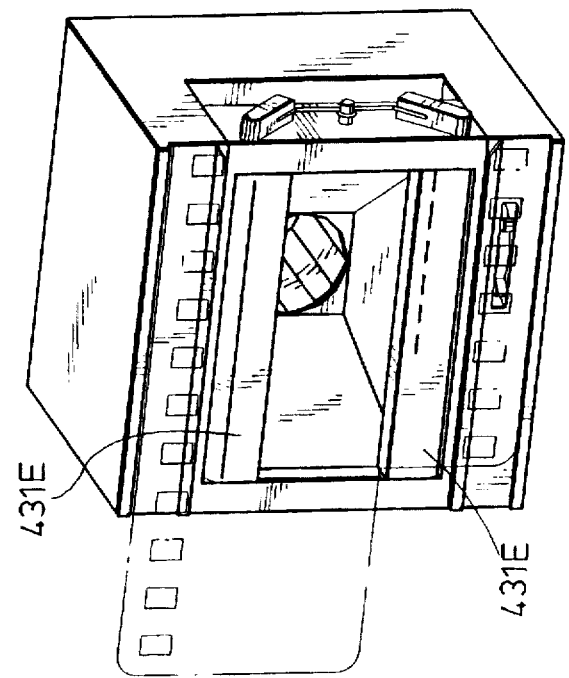

As illustrated in FIG. 12, in still another embodiment of this invention, the adjustment frame 43 includes upper and lower size regulating members 431E in the form of slats which are respectively mounted on the upper and lower frame members 431A, 431B by the use of two mounting arms 431F in a turnable position and which are biased to project into the opening 43A of the frame 43 to regulate the vertical dimension of the first screen area 43A, as shown in FIG. 13(A).

Referring to FIG. 13(B), in the event that the adjustment frame 43 is moved forward to the second position, the upper and lower size regulating members 431E are pushed by the rear housing portion of the lens housing 41 such that the regulating members 431E project rearwardly and outwardly of the opening 43A of the adjustment frame 43 so as to regulate the vertical dimension of the second screen area.

Referring again to FIG. 3, the camera according to this invention includes a driving mechanism for rotating the upper spindle member 31 of the cartridge mounting chamber 21 in a first direction to feed the built-in film thereof during the photographing operation and a second direction to wind up the film after completing the photographing operation. The driving mechanism includes a driving motor (not shown), a driving gear 67 connected to the driving motor via a transmission system including gear trains 200, 400, a light intercepting door driving gear unit 63 which is mounted on the top of the cartridge mounting chamber 21 and which is connected to a second spindle 632 mounted inside the chamber 21 for rotating the light intercepting door, and a planetary gear system 600 which is interposed between the driving gear 67 and the door driving gear unit 63. The door driving gear unit 63 includes a sector gear 631.

Figure 15:
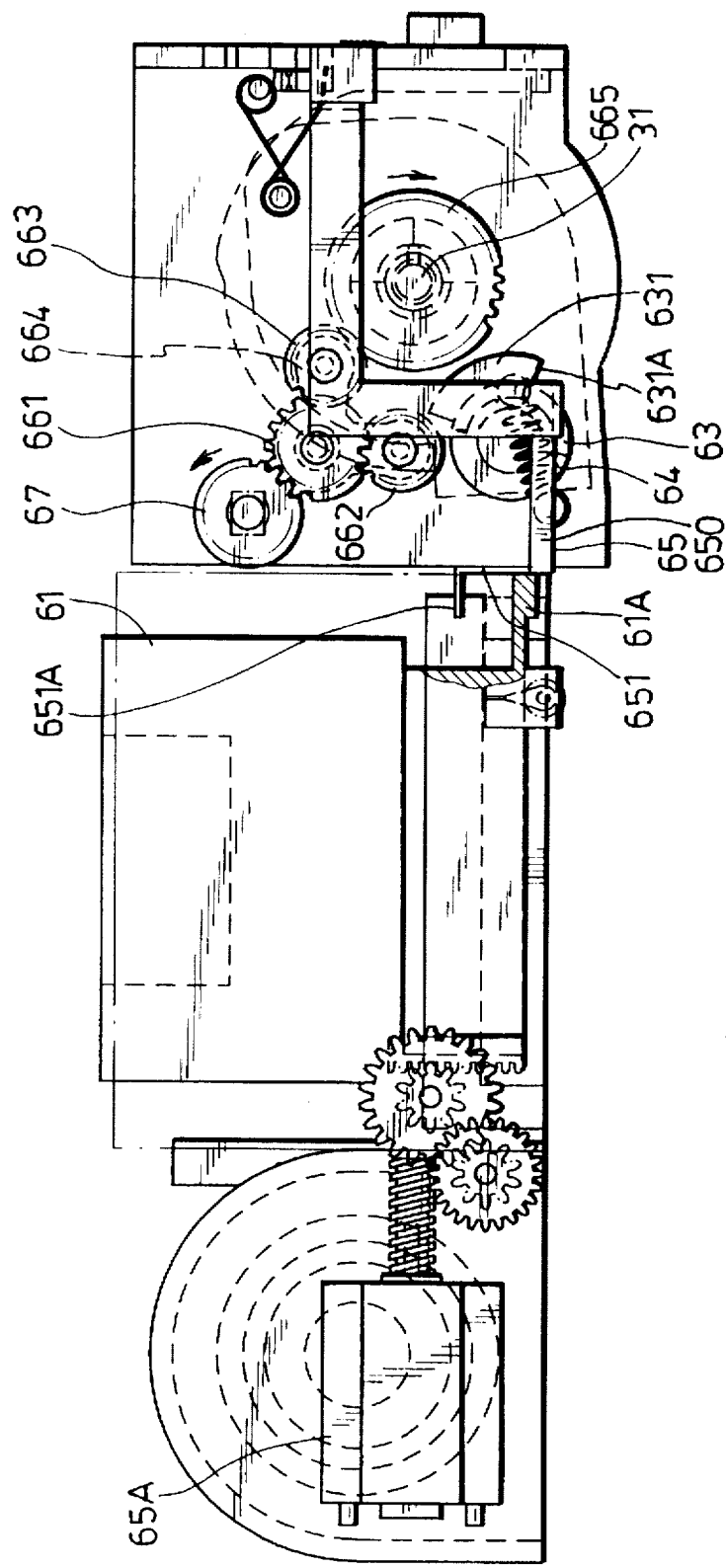
FIG. 15 is a top view, illustrating actuation of the film feeding mechanism wherein the light-intercepting door of the loaded APS film cartridge is turned about an axis to open an film exit thereof.
Figure 16:
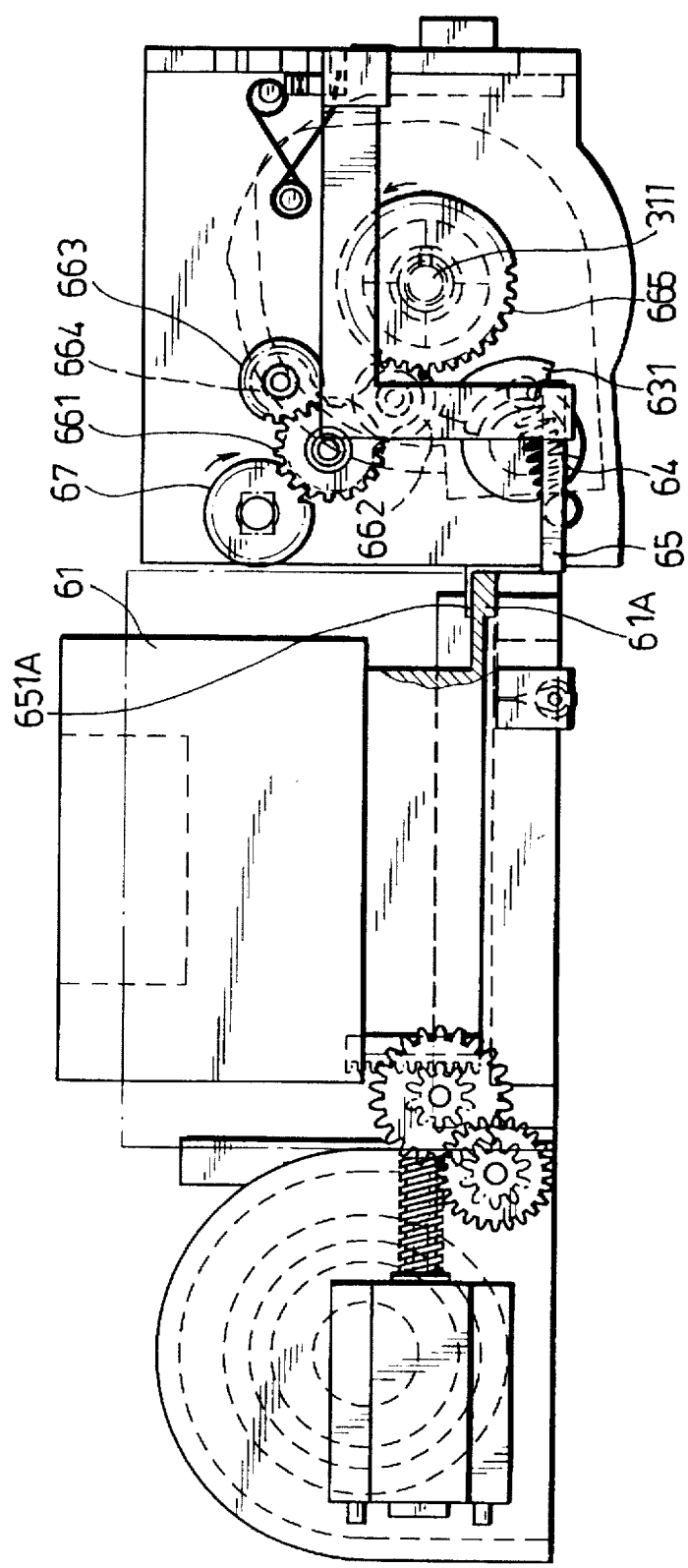
FIG. 16 is a top view, illustrating how the built-in film of the loaded APS film cartridge is fed out from the film exit thereof.
Figure 17:
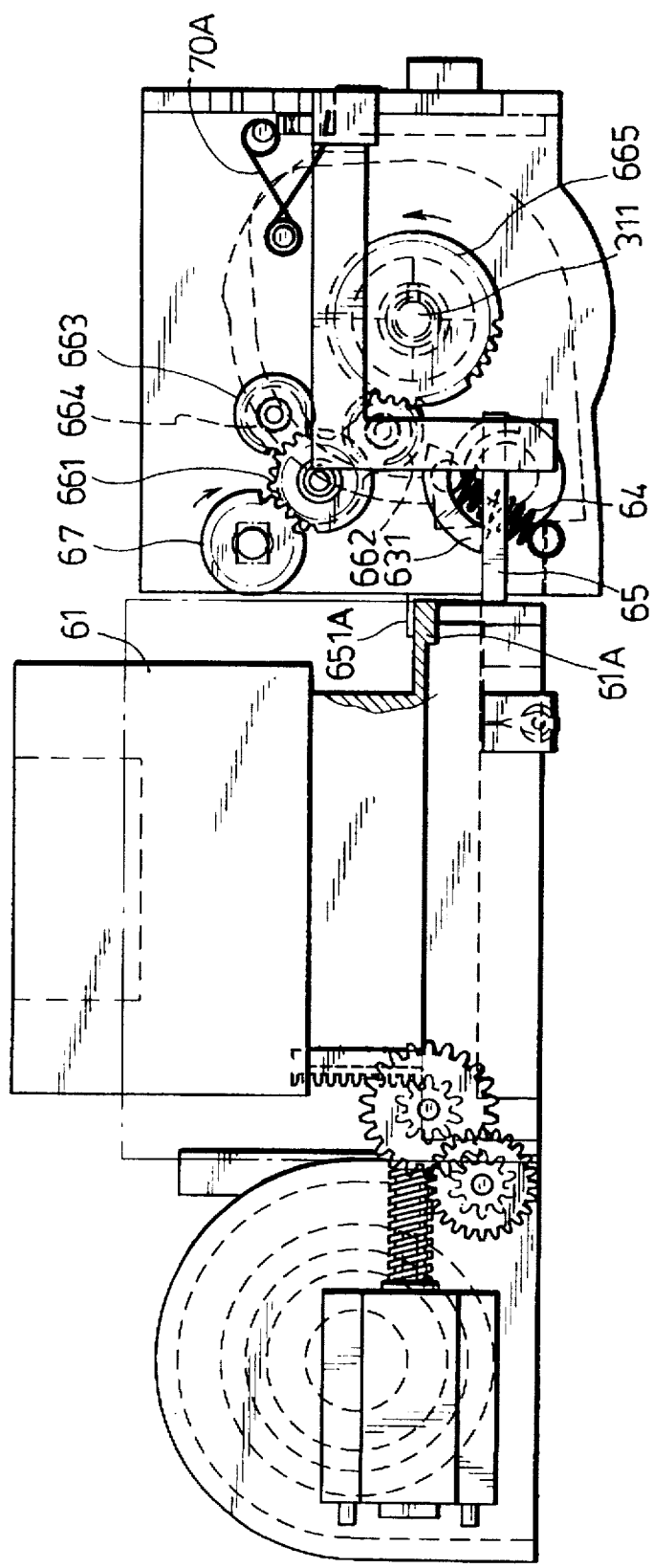
FIG. 17 illustrates how the film exit of the used APS film cartridge is closed due to forward movement of the focus lens of the camera of this invention.
Figure 18:
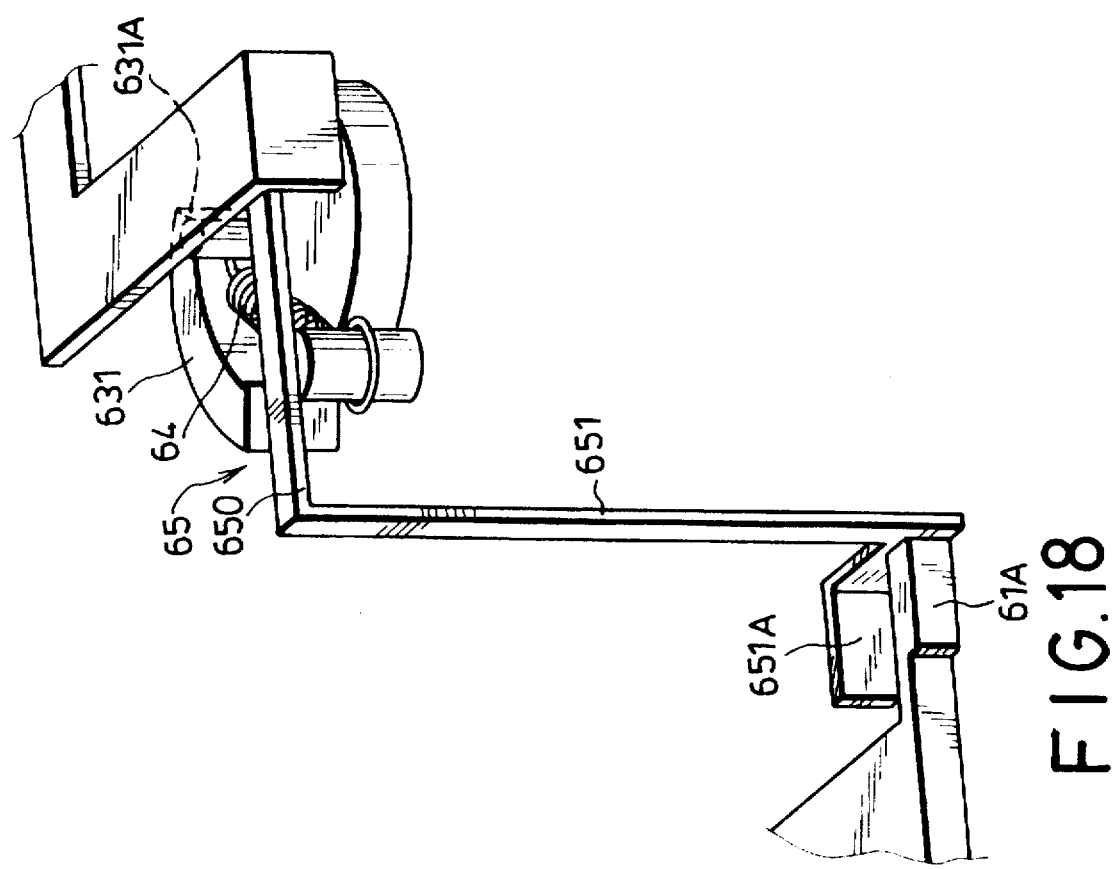
FIG. 18 is a cutaway view illustrating an actuating member for closing the door of a loaded film in the cartridge mounting chamber of the camera of this invention.

As illustrated in FIGS. 3, 14, 15, 16, 17 and 18, the planetary gear system 600 includes a sun gear 661 meshing with the driving gear 67, first and second planetary gears 662, 663 engaging the sun gear 661, and an L-shaped planetary carrier 664 which holds the planetary gears 662, 663 at two ends thereof. The first planetary gear 662 can mesh with the sector-shaped toothed portion of the sector gear 631. The planetary carrier 664 is turnable by the sun gear 661 through a friction mechanism (not shown) provided between the planetary carrier 664 and the sun gear 661. Upon actuation of the driving gear 67, the sun gear 661 is rotatable in two directions for turning the planetary carrier 664 between the two positions. In the first position, the first planetary gear 662 drives the toothed wheel 665, which is mounted on the top of the cartridge mounting chamber 21 so as to be coaxially connected to the upper spindle member 31, as best shown in FIG. 15. In the second position, the second planetary gear 663 drives the toothed wheel 665 in the second direction so as to wind up the used film into the hollow film cartridge, as best shown in FIG. 16 after the photographing operation.

When the planetary carrier 664 moves to the first position, the sector gear 631 is moved by the planetary gear 662 to a limited angular distance so as to turn and open the light intercepting door 127 (see FIG. 2) of the APS film cartridge before the toothed wheel 665 is driven by the first planetary gear 662 in the first direction. The tension spring 64 mounted on the cartridge mounting chamber 21 has a first end attached to the top of the cartridge mounting chamber 21 and a second end fixed to one end 631A of the sector gear 631. When the sector gear 631 is moved so that the second end of the tension spring 64 moves past the position which is diametrically opposite the first end of the spring 64, the sector gear 631 is prevented from rotating in the counter-clockwise direction, thereby keeping the light intercepting door of the APS film cartridge 12 in the open position (see FIG. 15). The sector gear 631 is unable to move from the position shown in FIG. 15 to the position shown in FIG. 14 without the assistance of an external force.

In order to close the light intercepting door, the invention further provides an actuating mechanism which is responsive to movement of a lens unit 61 employed in the photographing unit 4 of the camera. For this purpose, the lens unit 61 employed herein is arranged as a variable focus lens to be driven by a drive motor 65A. The actuating mechanism includes an inverted L-shaped actuating plate 65 which has an upper horizontal portion 650 movably provided adjacent to an end 631A of the sector gear 631, and a vertical portion 651 extending downwardly from the horizontal portion 650 and having a lower horizontal section 651A located adjacent to a push member 61A of the lens unit 61. The push member 61A is generally disposed at a rear portion of the lens unit 61 so as to abut with the lower horizontal section 651A during the forward movement of the focus lens 61. When the drive motor 65A (see FIG. 15) is actuated to move the focus lens 61 forward, the actuating plate 65 is pushed forward and correspondingly pushes the end 631A of the sector gear 631 to turn in the counter-clockwise direction for closing of the door exit. The actuating plate 65 is pushed backward by the sector gear 631 when the latter turns clockwise.

Figure 20:
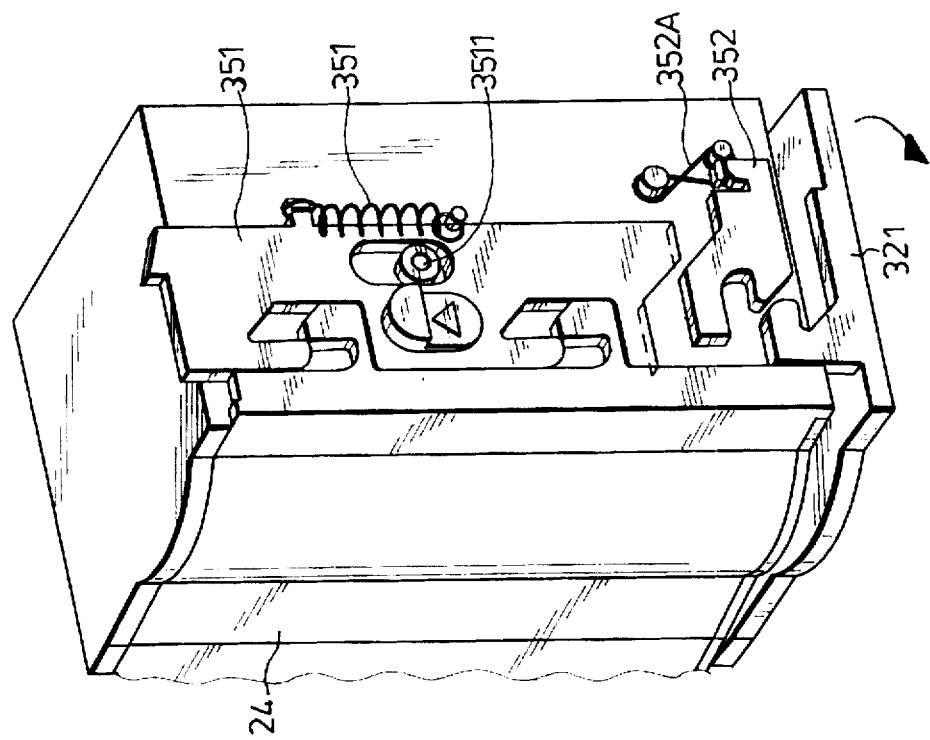
FIG. 20 is a lateral side view of the camera of this invention, the camera being illustrated in a state in which the bottom cover is openable relative to the film cartridge mounting chamber for loading of an APS film cartridge.
Figure 19:
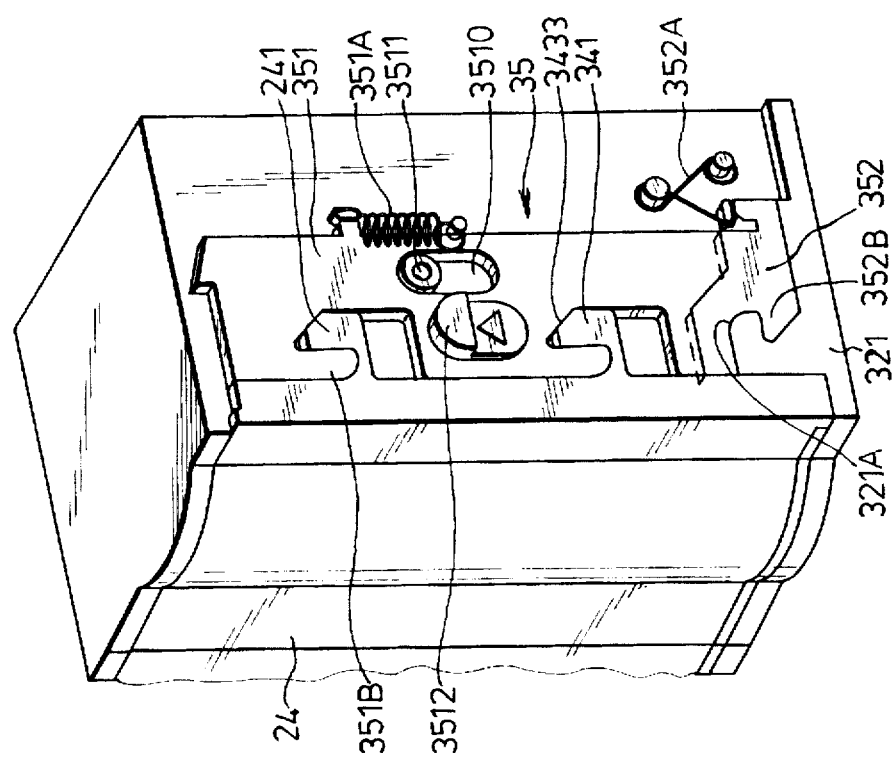
FIG. 19 is a lateral side view of the camera of this invention, the camera being illustrated in a state in which the back cover and the bottom cover are not openable relative to the film cartridge mounting chamber.
Figure 21:
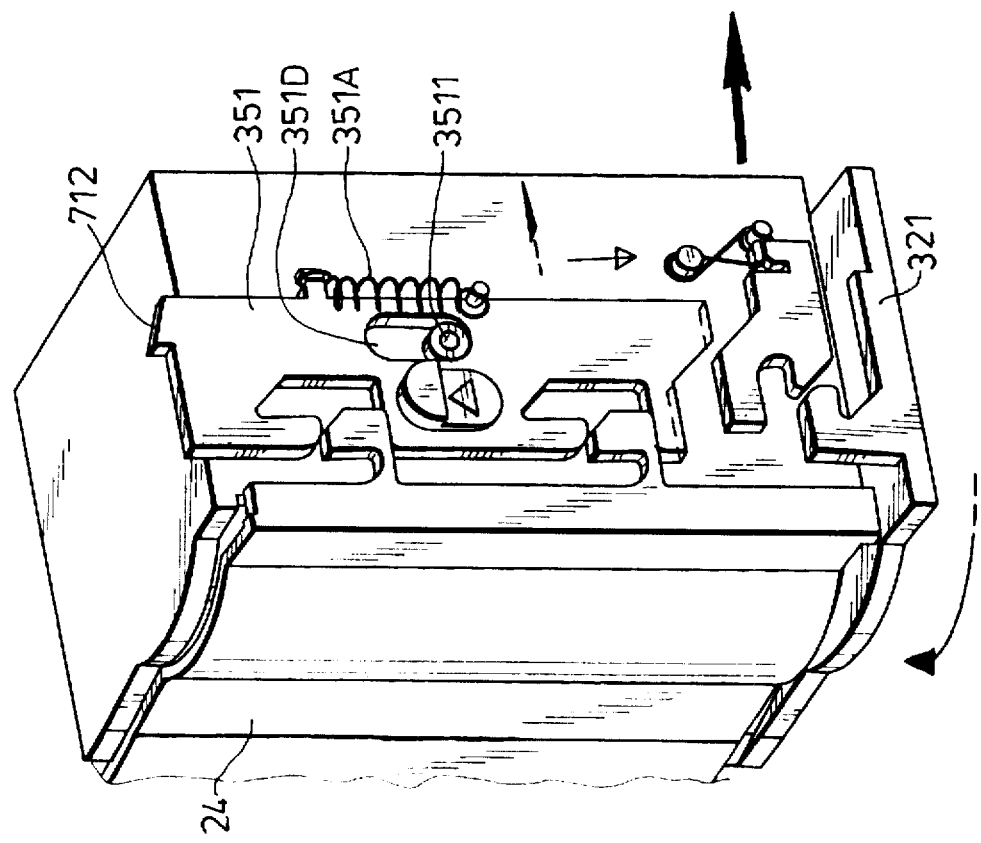
FIG. 21 shows the camera of this invention, illustrated in a state in which the back cover and the bottom cover of the camera are synchronously openable relative to the film cartridge mounting chamber for loading of a 135 mm film cartridge.

Referring to FIGS. 19, 20 and 21, the camera of this invention further includes a latch mechanism mounted on an external surface of the surrounding wall 35 for latching or unlatching the back cover 24 and the bottom cover 321. The latch mechanism includes a first slide plate 351 mounted movably on the external face of the surrounding wall 35 for sliding upward or downward, a second slide plate 352 mounted movably on the surrounding wall 35 for sliding rearward and forward, a first biasing member 351A which normally biases the first slide plate 351 downward, a second biasing member 352A which normally biases the second slide plate 352 forward, and a cam device formed on the first and second slide plates 351, 352. The first biasing member 351A employed in this embodiment is a restoration spring which normally biases the first slide plate 351 in downward direction to dispose the same at the lowest portion, wherein the lower slanted camming face of the first slide plate 351 engages an upper cam follower of the second slide plate 352. Under this condition, the first latch member 351B of the first slide plate 351 extends into the engagement space defined by the first engaging members 241 of the back cover 24, while the second latch member 352B of the second slide plate 352 extends into the engagement space defined by the second engaging member 321A of the bottom cover 321. The back cover 24 and the bottom cover 321 are therefore not openable relative to the cartridge mounting chamber 21 (see FIG. 3). Note that the latch members 351B, 352B and the engaging members 241, 321A embodied herein are upwardly-bent or forwardly extending hooks, and downwardly-bent or rearwardly extending anchors. In order to prevent separation of and restrain upward and downward movement of the first slide plate 351 on the surrounding wall 35, the first slide plate 351 further has an elongated guide slot 3510 formed therethrough and a manually operable knob 3512 fixed on the first slide plate 351. A stub member 3511 integral with the wall 35 projects into the guide slot 3510.

As best shown in FIG. 19, the upper edge of the guide slot 3510 contacts the stud member 3511 when the first slide plate 351 is at the lowest position. As shown in FIG. 21, the first slide plate 351 can be moved upward against tension of the restoration spring 351A, thereby disposing the same at the upmost position, wherein the lower edge of the guide slot 3510 contacts the stud member 3511 and in which both the first and second slide plates 351, 352 are disengaged from the first and second engaging members 241, 321A (see FIG. 19) of the back cover 24 and the bottom cover 321. The back cover 24 and the bottom cover 321 are openable relative to the cartridge mounting chamber 21 for loading of the large film cartridge (not shown) via the rear film cartridge opening 210 (see FIG. 3).

As illustrated in FIG. 20, in case of loading the small film cartridge (not shown), the first slide plate 351 can be lifted upward so as to hold the same temporarily at an intermediate position, wherein the back cover 24 is still in engagement with the first slide plate 351 and is therefore prevented from being opened but the second slide plate 352 is moved forward by tension of the second biasing means 352A so as to disengage from the bottom cover 321. Thus, the small film cartridge can be loaded into the cartridge mounting chamber 21 via the bottom film cartridge opening 323 (see FIG. 3).

Figure 22:
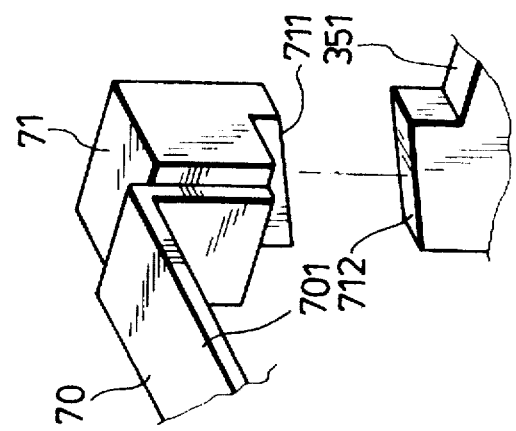
FIGS. 22 is an enlarged view illustrating how the back cover of the camera of this invention is prevented from being opened during the feeding and winding up operation of an APS film cartridge.

Referring to FIG. 22, the latch mechanism further includes a device cooperable with the sector gear 631 (see FIG. 3) for preventing the back cover from being opened untimely when the light-intercepting door is opened. The device includes a locking plate 70 mounted on the top of the cartridge mounting chamber 21 and has a lock piece 71 fixed to an outer end 701 of the locking plate 70 to lock the upward movement of the first slide plate 351. The lock piece 71 includes a slanted cam face 711 which is formed on a lower edge thereof. A cam face 712 is formed on an upper edge of the vertically movable first slide plate 351 so as to abut against the cam face 711. Since the locking plate 70 is biased rearward by a torsional spring 70A (see FIG. 17), the back cover 24 is openable relative to the cartridge mounting chamber 21 (see FIG. 3) only after the locking plate 70 has been moved frontward by the upward movement of the first slide plate 351. The frontward movement of the locking plate 70 can be prevented by the sector gear 631 when the sector gear 631 is at the position shown in FIGS. 15 and 16, wherein the sector gear 631 is prevented from moving in the counter-clockwise direction. When the sector gear 631 is turned counter-clockwise by the actuating plate 65, the locking plate 70 can be released from the sector gear 631 and can thus be moved forward by the upward movement of the first slide plate 351 for opening of the back cover 24.

With this invention thus explained, it is apparent that numerous modifications and variations can be made without departing from the scope and spirit of this invention. It is therefore intended that this invention be limited only as indicated in the appended claims.

I claim:

1. A camera capable of accommodating a film cartridge having a cartridge spool, a film exit, and a light-intercepting door openable at the film exit by turning about a door axis, said camera comprising:

a cartridge mounting chamber which receives the film cartridge and which has a first spindle for holding said cartridge spool;

a drive mechanism for rotating said first spindle in a first direction to feed the film during the photographing operation and in a second direction to wind up the film after completing the photographing operation, said drive mechanism including a sun gear, a first planetary gear and a second planetary gear engaging the sun gear, and a planetary carrier holding said first and second planetary gears and having an axis of rotation coaxial with said sun gear, said sun gear being rotatable in two directions for turning said planetary carrier between a first position, in which said first planetary gear drives said first spindle in said first direction, and a second position in which said second planetary gear drives said first spindle in said second direction; and a door driving gear mounted on the top of said film mounting chamber and incorporating a second spindle to be connected to said door axis, said door driving gear being engageable with one of said first and second planetary gears before said planetary carrier reaches said first position so as to open said light-intercepting door of said film cartridge before said first spindle is rotated in said first direction.

2. The camera as claimed in claim 1, wherein said door driving gear includes a sector gear having a sector-shaped toothed portion.

3. The camera as claimed in claim 2, further comprising a back cover for closing said film mounting chamber, a variable focus lens provided adjacent to said cartridge mounting chamber, a lens moving mechanism for moving said variable focus lens, and an actuating mechanism connected to said lens moving mechanism for turning said sector gear so as to close said light-intercepting door.

4. The camera as claimed in claim 3, further comprising means for preventing said back cover from being opened when said light-intercepting door is opened, said means being cooperative with said sector gear.

5. A camera capable of accommodating a film cartridge having a cartridge spool, a film exit, and a light-intercepting door openable at the film exit by turning about a door axis, said camera comprising:

a cartridge mounting chamber;

a drive mechanism for feeding the film of said film cartridge;

an opening mechanism for opening said light-intercepting door of said film cartridge after said film cartridge is loaded in said cartridge mounting chamber, said opening mechanism including a spindle mounted inside said cartridge mounting chamber to connect with said door axis, and a sector gear connected to said spindle, said sector gear being engageable with said drive mechanism to drive said spindle and being releasable from said drive mechanism after being rotated to a limited angular distance, said drive mechanism proceeding with a film feeding operation as soon as said sector gear is released from said drive mechanism;

a back cover for closing said film mounting chamber, a variable focus lens provided adjacent to said cartridge mounting chamber, a lens moving mechanism for moving said variable focus lens, and an actuating mechanism actuated by said lens moving mechanism for actuating said sector gear so as to close said light-intercepting door.

6. A camera capable of accommodating a film cartridge having a cartridge spool, a film exit, and a light-intercepting door openable at the film exit by turning about a door axis, said camera comprising:

a cartridge mounting chamber;

a variable focus lens provided adjacent to said cartridge mounting chamber;

a lens moving mechanism for moving said variable focus lens;

a spindle mounted inside said cartridge mounting chamber to connect with said door axis;

a gear connected to said spindle for driving said spindle; and an actuating mechanism actuated by said lens moving mechanism for turning said gear so as to close said light-intercepting door.

7. The camera of claim 6, wherein said gear is a sector gear.

8. The camera of claim 7, further comprising a cartridge mounting chamber, and a drive mechanism for feeding the film of said film cartridge, said sector gear being engageable with said drive mechanism after being rotated to a limited angular distance, said drive mechanism proceeding with a film feeding operation as soon as said sector gear is released from said drive mechanism.

* * * * *